(No Model.)
J. B. MOORE.
BACK BAND HOOK.
No. 334,884. Patented Jan. 26, 1886.
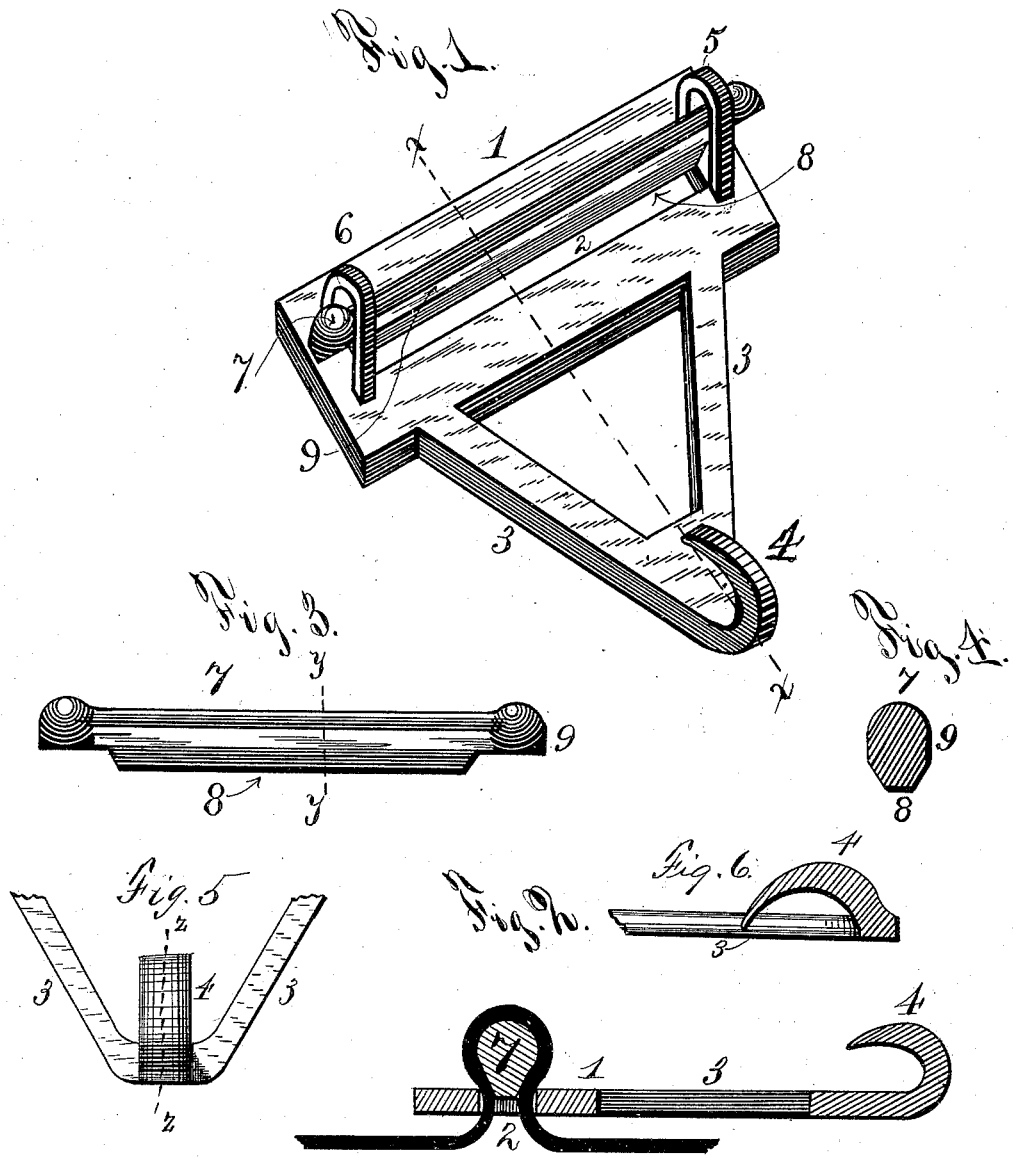
Witnesses.
J. Charleton Ingram.
F. S. Duffie
Inventor.
Jesse B. Moore
By his attorney
John S. Duffie

UNITED STATES PATENT OFFICE.

JESSE B. MOORE, OF EL DORADO, ARKANSAS.

BACK-BAND HOOK.

SPECIFICATION forming part of Letters Patent No. 334,884, dated January 26, 1886.

Application filed October 24, 1885. Serial No. 180,885. (No model.)

*To all whom it may concern:*

Be it known that I, JESSE B. MOORE, a citizen of the United States, residing at El Dorado, in the county of Union and State of Arkansas, have invented certain new and useful Improvements in Back-Band Hooks, (being an improvement on the back-band hook filed by Johnson and Moore August 19, 1885, Serial No. 174,792;) and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to back-band hooks; and it consists in the novel construction and arrangement of its parts.

In the accompanying drawings, Figure 1 is a perspective view of my hook. Fig. 2 is a sectional view of the same cut through Fig. 1 on the line $x$ $x$. Fig. 3 is a side elevation of the headed pin. Fig. 4 is a sectional view on the line $y$ $y$. Fig. 5 is a face view of the lower part of arms 3, bearing the hook 4. Fig. 6 is a sectional view of Fig. 5 cut on the line $z$ $z$.

My invention is described as follows: I make a plate, 1, having a slot, 2, lengthwise in the same. From one edge of the plate I extend two arms, 3, which come together at their lower end and terminate in a hook, 4. On the upper face of plate 1, and at either end of the said slot 2, I have elongated eyes 5 and 6. In these eyes 5 and 6 is a double-headed pin, 7, having a flange, 8, which is V-shaped, the beveled edge being down and fitting into slot 2. The sides 9 of this pin are flat near its ends, and fit loosely in the elongated eyes 5 and 6. The flat sides prevent the pin from turning, and it being fitted loosely in the said eyes enables it to play up and down, the object of which is hereinafter shown.

I insert the back-band into the hook as follows: The back-band is looped over the top of the pin 7. Then the pin is raised, which opens the slot 2, and both ends of the back-band are passed down through said slot, and when the back-band is pulled on, the pin is drawn tight down into the slot and grasps the back-band between itself and either edge of said slot 2 and prevents it from slipping.

I do not confine myself to any particular shape of that part of the pin that grasps the back-band. A round or a hexagon shape will answer the same purpose if made large enough to rest against the edges of the slot 2. The heads of the pin are made large enough to prevent them from slipping through the eyes 5 and 6. Nor do I confine myself to a plate, 1, having two eyes; but I claim the right to manufacture the same with but one eye, as the gist of this invention is to hold the pin from turning, and also to permit it to be raised up from the said slot 2 to enable the back-band to be passed through the said slot, and one eye will answer that purpose as well as two would. Nor do I confine myself to any particular shape of the hook 4. The same may be bent up, as shown in Figs. 1 and 2; or it may be a prong raised on the face of that portion of the hook where the two arms 3 meet, as is shown in Figs. 5 and 6.

I do not claim anything for the shape of the hook 4, as I know either shape mentioned is old; but What I do claim as new, and desire to secure by Letters Patent, is—

1. A back-band hook consisting of the plate 1, having the slot 2 and hook 4, elongated eyes 5 and 6, and a double-headed pin, 7, having the flat sides 9, said pin fitting loosely in the said eyes, substantially as and for the purposes set forth.

2. A back-band hook consisting of the plate 1, having the slot 2 and hook 4, elongated eye 5 and double-headed pin 4, having the flat sides 9, said pin fitting loosely in the said eye, as and for the purposes set forth.

In testimony whereof I affix my signature in presence of two witnesses.

JESSE B. MOORE.

Witnesses:
JOHN S. DUFFIE,
D. P. COWL.